United States Patent [19]
Corbin

[11] Patent Number: 5,881,241
[45] Date of Patent: Mar. 9, 1999

[54] SYSTEM FOR TRANSMITTING DATA PACKET AFTER MATCHING DATA PACKET'S ROUTING PATTERN WITH PREDETERMINED DATA ROUTES STORED IN A ROUTE TABLE

[75] Inventor: John R. Corbin, El Paso, Tex.

[73] Assignee: Sun Microsystems, Inc., Mountain View, Calif.

[21] Appl. No.: 666,862

[22] Filed: Jun. 19, 1996

[51] Int. Cl.⁶ .................................................. G06F 13/00
[52] U.S. Cl. .............................. 395/200.68; 395/200.7; 395/200.72
[58] Field of Search ..................... 370/231, 406, 370/228; 395/200.68, 200.7, 200.72

[56] References Cited

U.S. PATENT DOCUMENTS 5,088,091  2/1992  Schroeder et al. ..................... 370/406
5,199,027  3/1993  Barri ..................................... 370/231
5,321,813  6/1994  McMillen et al. ..................... 370/228

*Primary Examiner*—Le Hien Luu
*Attorney, Agent, or Firm*—Blakely Sokoloff Taylor & Zafman

[57] ABSTRACT

Data routing of the present invention is a capability of pre-configuring routes for data traveling through the software or the hardware of a computer system. The routes are set up by a consumer of the data or the destination and are delivered to the producer of the data or the source. The data route may include an identification of the consumer of the data, a minimal list of routines which will perform some preprocessing of the data, a return route, a don't care mask, a set of registered routes and a set of actions. The set of actions can be a set of states to transition or a set of functions to call. In order to determine a data route hit, the incoming data from the producer is AND'ed with the don't care mask, the results of which is then compared with the set of registered routes, i.e. a pattern of bits. If the results are equal, then there is a data route hit. The incoming data from the producer is then passed off to the actions.

21 Claims, 7 Drawing Sheets

| ACTION | DATA ROUTE UNODE | MODULE | |
|---|---|---|---|
| OPEN MODULE A | $R_A$ $M_A$ $A_A$ $RR_A$ $I_A$ | MODULE A | $R_A$ $M_A$ $A_A$ $RR_A$ $I_A$ |
| PUSH MODULE B ON MODULE A | $R_A U R_B$ $M_A U M_B$ $A_A U A_B$ $RR_A U RR_B$ $I_A U I_B$ | MODULE AUB | $R_A U R_B$ $M_A U M_B$ $A_A U A_B$ $RR_A U RR_B$ $I_A U I_B$ |
| PUSH MODULE C ON MODULE AUB | $R_A U R_B U R_C$ $M_A U M_B U M_C$ $A_A U A_B U A_C$ $RR_A U RR_B U RR_C$ $I_A U I_B U I_C$ | MODULE AUBUC | $R_A U R_B U R_C$ $M_A U M_B U M_C$ $A_A U A_B U A_C$ $RR_A U RR_B U RR_C$ $I_A U I_B U I_C$ |
| BIND MODULE AUBUC TO $NIU_Z$ | $NIU_Z R_A U R_B U R_C$ $NIU_Z M_A U M_B U M_C$ $NIU_Z A_A U A_B U A_C$ $NIU_Z RR_A U RR_B U RR_C$ $NIU_Z I_A U I_B U I_C$ | MODULE $NIU_Z$UAUBUC | $NIU_Z U R_A U R_B U R_C$ $NIU_Z U M_A U M_B U M_C$ $NIU_Z U A_A U A_B U A_C$ $NIU_Z U RR_A U RR_B U RR_C$ $NIU_Z U I_A U I_B U I_C$ |

$R_A$ – DATA ROUTE FOR MODULE A $M_A$ – DATA ROUTE MASK FOR MODULE A $A_A$ – UPSTREAM ACTIONS FOR MODULE A $RR_A$ – DOWNSTREAM ACTIONS FOR MODULE A $I_A$ – IOCTL PATH FOR MODULE A

U – UNION, OR JOIN, OR APPEND OPERATION

FIG. 4

FIG. 6B
| ROUTE BIT 610 | ROUTE 612 | MASK 614 |
|---|---|---|
| A | 0110 | 0110 |
| B | 0010 | 0011 |
| C | 010000 | 110000 |
FIG. 6C
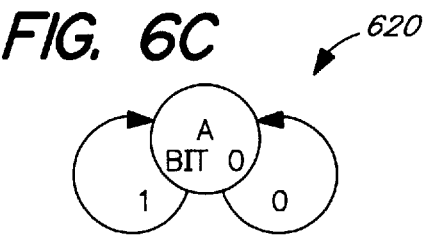
FIG. 6D
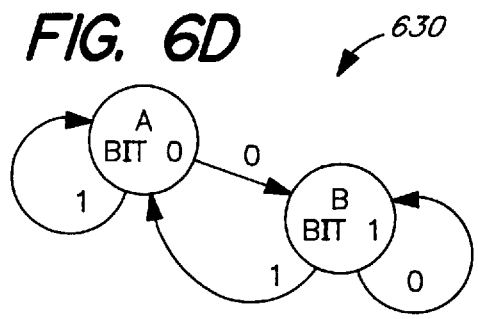
FIG. 6E
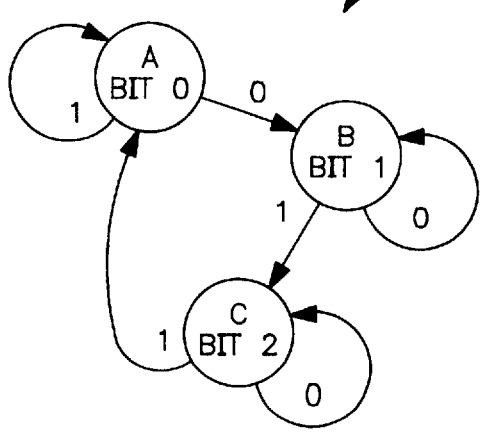
FIG. 6F
|  |  | EXTRA BITS |
|---|---|---|
| C MASK | 110000 |  |
| DATA | 010001 | 11000 |
| MASKED DATA 660 | 010000 |  |
C DATA ROUTE = 010000
662

SYSTEM FOR TRANSMITTING DATA PACKET AFTER MATCHING DATA PACKET'S ROUTING PATTERN WITH PREDETERMINED DATA ROUTES STORED IN A ROUTE TABLE

BACKGROUND OF THE INVENTION (1) Field of the Invention

The present invention is related to the field of communication frameworks. More specifically, the present invention is related to a method and an apparatus for establishing data routes between a consumer and a producer on a computer system.

(2) Prior Art

Computer systems typically utilize a layered approach for implementing functionalities relating to communications frameworks where a layer is a program module for processing different portions of data traveling from a producer to a consumer. A disadvantage to the layered approach is that it requires examination of data by each layer to determine if any work needs to be performed by that layer before sending the data to the next layer. This examination process requires computer instructions and data to be read by the central processing unit(s) (CPU), consuming CPU cycles and time. For many cases, a given layer may not do any real work. Thus the layered approach to a communication framework is a high cost approach to processing of data.

A well known example of a layered approach is the use of AT&T's STREAMS framework. The interfaces for this framework are well known. STREAMS utilizes a layered approach to build communication services, examples being a protocol stack or a terminal interface. Writing simple STREAMS modules may be easy. From a user level, STREAMS modules can be selected and interconnected without writing any kernel level code provided that the required STREAMS modules have been implemented.

In the STREAMS framework, incoming packets are pushed upstream through independent STREAMS modules in an effort to determine the final destination of the packet. The final destination or consumer, is typically sitting on top of the stream head. For outgoing packets, the packets are pushed downstream in an effort to determine which STREAMS driver should be utilized to transmit the packet. An example of a STREAMS driver is a Networking Interface Unit (NIU) which is a hardware component that sends and receives data over a physical medium. An example of an NIU is an Ethernet Interface.

Several problems exist which are associated with the STREAMS framework. For one, utilizing the STREAMS framework can take approximately 0.002% of available CPU cycles to push a packet between modules. Such overhead quickly adds up in light of the number of STREAMS modules which must be traversed when a packet is being transmitted up and down a data stream. For example, if there are six layered modules, then it takes 0.021% of available CPU cycles to go up and down the layered modules. Another prevalent problem is that there is little code locality. Hence, in a system utilizing virtual memory, for example operating systems implemented in workstations available from Sun Microsystems Inc., code between two modules will not share the same page in memory. This results in an increase in the overhead of a virtual memory subsystem. In addition, the overhead of the framework is enormous in terms of the number of instructions required to implement a STREAMS module. Another problem with the STREAMS framework is that since there is a large amount of code required to implement the framework and because STREAMS is feature rich and complicated, it is difficult to prove that it performs correctly.

Yet another concern is the STREAMS working relationship with a multi-threaded kernel with relatively fine grain locking. The use of fine grain locking is a simple method to improve system performance and is well known in the art. Unfortunately, fine grain locking impacts uni-processor performance by placing too many unnecessary lock related checks in the code path. The performance of the STREAMS framework and the STREAMS modules in the critical code paths may be improved in such a case. However, the kernel implementation of the STREAMS framework is very complex and modifications can be non-trivial.

There is therefore a need for a method and an apparatus for a new and simple communication services framework that has little if any overhead and for which it is easy to prove correctness.

BRIEF SUMMARY OF THE INVENTION

A method and an apparatus for a new communication framework, referred herein as the data routing framework are disclosed. The new method and apparatus overcomes the many disadvantages of the prior art communication framework referred to as the layered approach. The present invention allows computer systems to establish data routes between the consumer and the producer of the data without having to have the data transmitted through all the layers between the consumer and the producer as traditionally required by the layered approach.

More specifically, the traditional layered approach to data communication sets up N number of modules (or layers) between a producer and a consumer of data. The modules may examine or process specific pieces of the data to determine the next module to call. The process then continues until the data reaches its final destination.

In contrast, the data routing approach of the present invention pre-configures routes for data traveling through the software or the hardware of a computer system. In this way, the data is processed only by the set of actions or functions which need to be invoked for the particular data.

With the present invention, the data routes are set up by the consumer or the destination of the data and are delivered to the producer or the source of the data. The data route may include an identification of the consumer of the data, a minimal list of routines which will perform some preprocessing of the data, a return route, a don't care mask, a set of registered routes and a set of actions. The set of actions may be a set of states to transition or may be a set of functions to call to enable the transmission of the data from the producer to the consumer.

The set of actions and functions indicated in the data route are invoked when incoming data from a producer matches a pattern in a data route table. A data route table contains a list of predetermined pattern of bits which represent a set of pre-determined or registered routes. In order to determine a data route hit, the incoming data from the producer is And'ed with a don't care mask of the data route created by the consumer of the data. The result is then compared with the set of registered routes, i.e. the pattern of bits. If the results are equal, then there is a data route hit. The don't care mask of the data route is utilized to mask the significant bits from the incoming data before performing an equivalence check. When there is a data route hit, the consumer may determine the path the data is to travel from the corresponding data pattern in the data route table. From the data pattern match, the consumer informs the producer of the set actions and functions which need to be invoked for the particular data being transmitted. The set of actions and functions are indicated in the data route created by the consumer.

The present invention's data routing module for a communication framework may be used with all networking services including IP (Internet protocol) or UDP/IP (User Datagram Protocol/Internet Protocol) or TCP/IP (Transmission Control Protocol/Internet Protocol). IP is a protocol used to route data from a source to its destination in an environment with multiple networks. UDP is a packet-level protocol typically built directly on IP and used for application-to-application communication between TCP/IP host systems. TCP/IP is a set of communication protocols which support peer-to-peer connectivity functions for both local and wide area networks. TCP is a communications protocol typically used in Internet and in any network which follows the U.S. Department of Defense Standards for Inter-Network Protocol.

With the routing method and apparatus of the present invention, a consumer may register a set of actions or functions to invoke for a given pattern of bits of the incoming data in a data route, since the consumer knows the path which the data will follow. The set of actions or functions performs the necessary processing of the data produced by the producer before it reaches the consumer. This is advantageous in that in contrast to the traditional layered networking framework of data transmission, data does not have to be transmitted through every layer between a consumer and a producer in order for the necessary set of actions or functions to process the data. Additionally, the amount of code required to be executed to transmit data from the producer to the consumer is significantly reduced. Lock contention in multi-processor systems is significantly reduced as well since a given function performing an action knows that it owns the data passed into it and that no other module is contending for the data. In addition, the number of locking calls is reduced, thus improving uni-processor performance.

BRIEF DESCRIPTION OF THE DRAWINGS

FIG. 4 illustrates an exemplary data route construction.

FIG. 6b–6f illustrates an exemplary Patricia Tree search as may be used by the present invention.

DETAILED DESCRIPTION OF THE INVENTION

The present invention provides for a method and an apparatus referred to herein as data routing. Data routing allows pre-configuring of routes for data traveling through software or hardware of a computer system. The routes are set up by the consumer of the data or the destination, and the routes are delegated to the producer of the data or the source. An exemplary data route identifies the consumer of the data, a minimal list of routines which will form some pre-processing of the data and may include a return route, a pattern of bits, a don't care mask and a set of actions. To determine a data route hit, data to be transmitted from a producer to a consumer is AND'ed with the don't care mask of the data route. The result is then compared with a set of registered routes, i.e. pattern of bits, in a data route table. If they are equal, then there is a data route hit. Incoming data from the producer is then passed off to the actions of the data route which can be a set of states to transition or a set of functions to call.

Figure 1:
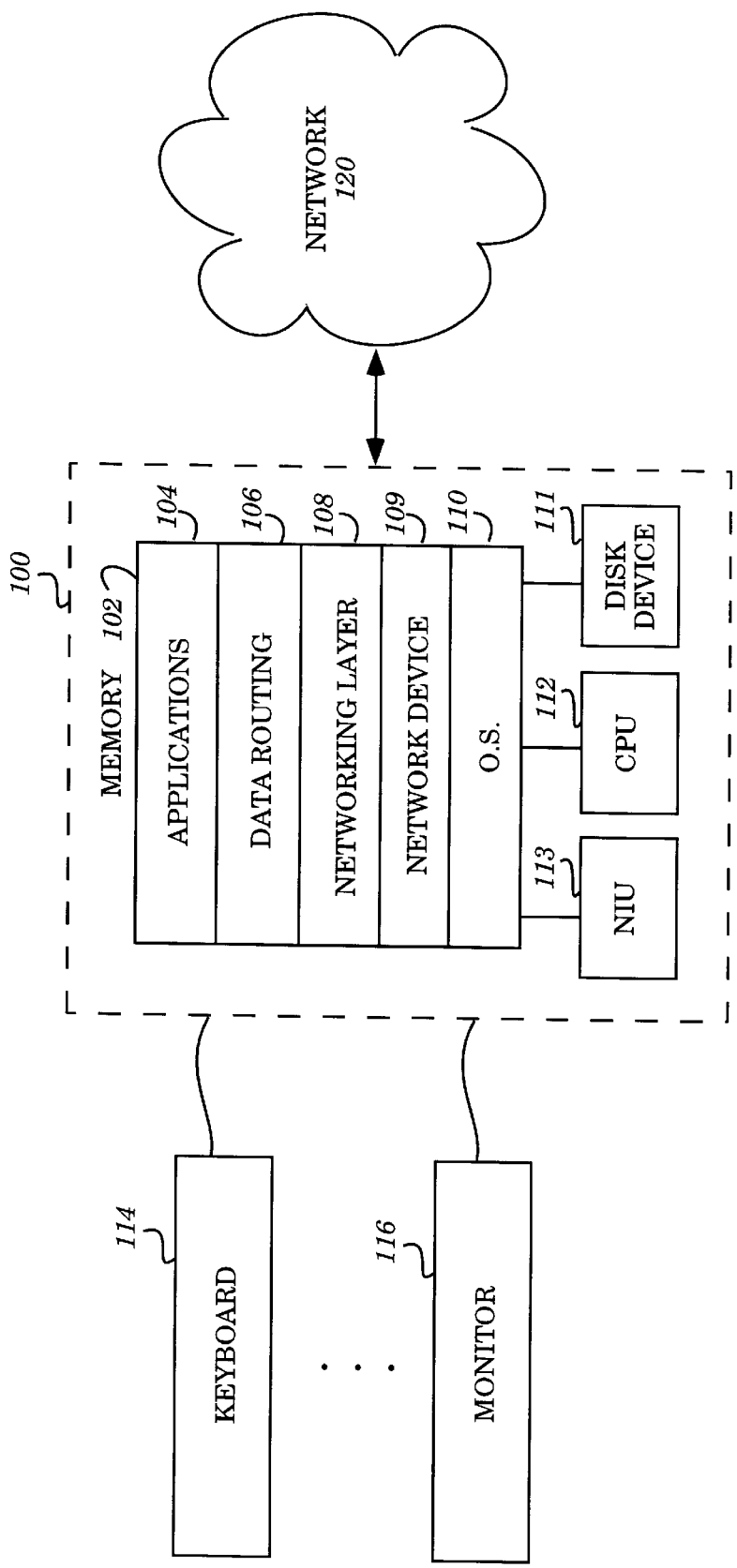
FIG. 1 is a system block diagram showing the data routing framework of the present invention.

FIG. 1 is a system block diagram which includes an implementation of the data routing method and apparatus of the present invention. Computer system 100 has memory 102 with applications 104, data routing mechanism 106, networking layer 108, operating system 110 and NIU (Network Interface Unit) 113. An NIU (Network Interface Unit) as referred herein is a hardware component which transmits and receives data over a physical media. An example of an NIU is an Ethernet Interface. Memory 102 is coupled to CPU 112 and storage device 111. Computer system 100 may have various peripheral devices coupled to it such as keyboard 114 and monitor 116. Computer system 100 may interface with one or more networks. Network 120 may interface with computer system 100 for example for exchanging data between computer system 100 and another computer or computers in network 120. An application, a peripheral device and a network, can be both a producer and a consumer of data.

Given incoming data from a producer, a consumer knows how the data will be processed by using data routing of the present invention. Since the consumer knows the path which the data will follow, the consumer may register a set of actions or functions to invoke for a given pattern of bits of the incoming data in a data route. More specifically, one embodiment utilizes a data route table having a list of pattern of bits, i.e. a set of registered routes. When incoming data from a producer matches one of the pattern of bits in the data route table, the consumer may tell the path which the incoming data will take and can also notify the producer of the set of actions or functions to invoke for the particular incoming data. This is advantageous in that in contrast to the traditional layered networking framework of data transmission, data does not have to be transmitted through every networking layer between a consumer and a producer for the necessary set of actions or functions to be invoked for the data being transmitted.

Figure 2:
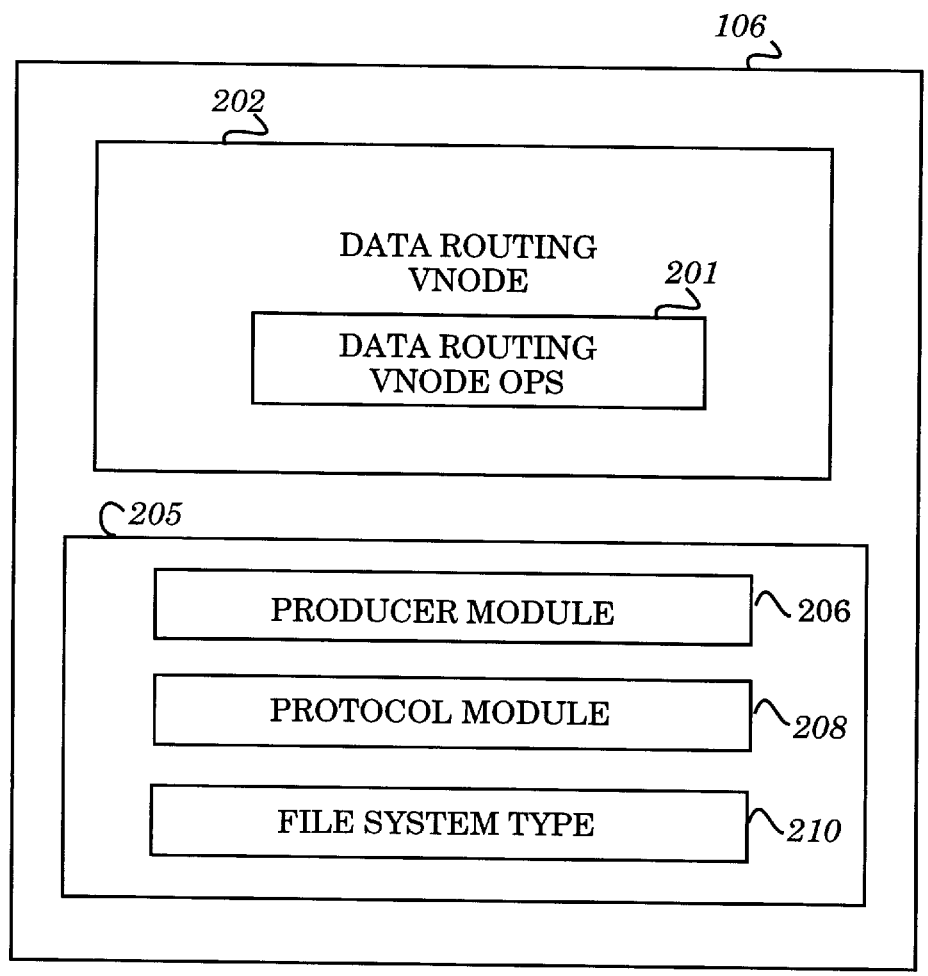
FIG. 2 is a block diagram of an exemplary implementation of the present invention.

FIG. 2 is a block diagram of an exemplary implementation of the present invention's data routing mechanism 106 illustrated in FIG. 1. Data routing mechanism 106 has a data routing vnode 201 with data routing vnode operations 202, and a set of data routing modules 205 including producer module 206, protocol module 208 and file system type module 210. A vnode (virtual node) typically refers to an object in a file system that represents a file and is well understood in the art. Vnodes are used to communicate between the upper half of the file system and file system representations. Vnode operations are typically operations performed on a file such as, open, close, read, write, ioctl, and link.

The data routing framework of the present invention allows routes to be established between a networking device driver and applications 104. Data from network 120 typically flows through system memory 102 on its way to a consumer of the data which may be an application or a location on a storage device on computer 100. Storing of data is typically considered to be a consumer action and retrieving of data from stable storage is considered to be a producer action. Application 104 operates on data from operating system 110 through a file descriptor. A file descriptor is used to describe a file and is well known in the art. For example, a typical file descriptor is a small positive integer that a system uses instead of a file name to identify an open file.

Since application 104 operates on data from operating system 110 through a file descriptor, it is desirable to route the data from networking device 109 to a user's file descriptor and vice versa. Similarly, it is desirable to route the data from a user process to stable storage (write operation) and to establish a return route (read operation). A path may also be established for some applications 104 between network 120 and the disk, for example, RCP (Remote Copy Program).

Different embodiments for an implementation of the data routing method and apparatus exist. In one exemplary embodiment, a new data routing vnode type is established without the need for implementing a new file system. In this embodiment of the present invention, a new data routing vnode type is established by defining a data routing vnode operation 202 without the need for providing data routing VFS (Virtual File System) operations. Additionally, kernel modules that support data routing are identified so that a specfs open routine (where specfs refers to a special file system used to handle device nodes) can be modified to deal with opening a data routing module and setting up a data routing vnode 201 to be returned from the specfs open routine. The data routing vnode 201 is then used in all future file operations. Additionally, data routes are built automatically. For an example of an automatic data route construction, refer to the description for FIG. 4 below. Applications 104 do not have to know the data routing framework which supports applications 104. In another embodiment, a new data routing module type is defined. This approach modifies the kernel to deal with the new data routing module type.

In the presently preferred embodiment, the data routing mechanism 106 implements the supported data routing vnode operations 202 used by data routing modules 205. Not all vnode operations 202 are supported by the data routing vnode. An exemplary list of the supported operations and the functionality required of a sample of data routing vnode operations 202 are listed in Appendix A. A detailed description of a data routing vnode is provided in the description for FIG. 3 below.

There are three different types of data routing modules 205 in data routing framework 106. The first type is producer and/or consumer device driver module 206 (also referred herein as producer module 206). Producer module 206 includes a set of device driver routines. Examples of such driver routines are NIU (Networking Interface Unit) or a disk driver. Sample exemplary producer modules 206 are listed in Appendix B. A second type is protocol module 208 which provides interfaces for the actions which need to be performed on a data routing hit. Exemplary specifics of each protocol module's implementation of the required functions are listed in Appendix B. The third type of module is file system type module 210 which supplies the data routing file system's specific code to facilitate fast user level data reads and writes.

Various functionalities are provided for each module type. Producer/consumer device driver modules 206 must implement the functions: open, close, read, write and ioctl (input/output control) which are used by protocol and file system modules. For the open function, the producer device driver module 206 must perform the open function when the networking layer 108 is binding a network address to the NIU. The NIU open routine advertises the availability of its network interface to the protocol modules and operating system. This information is used later to determine which data routes get associated with which NIU's. The close function is performed when the network layers are unbinding a network address to the NIU. The read function is the network device driver 109's read routine and is called when the device receives a packet. The write function is the networking device driver's write routine and is called to send a packet out onto the network. The ioctl function processes input/output control requests issued by data routing modules, the application or the NIU. If an ioctl request is not understood, then an error is returned. Driver ioctl's may be NIU specific. Exemplary ioctl's which all NIU drivers should support include "I__DRTE__NIU__IF" which returns information regarding the interface, and I__REG__ROUTE which specifies routes registered with the producer and I__UNREG__ROUTE which unregister the specified route with the producer.

Protocol modules 208 must implement the following functions: open, close, read, write and ioctl which are used by the NIU, other protocol modules, or the application. The open function updates the data routing entry. Protocol module 208's prototype route, mask, actions and ioctl lists are added to the end of the vnode's respective data route fields. The close function removes the data route from the search tree and frees the data entry. An exemplary embodiment of a search tree for use with the present invention is illustrated in the description accompanying FIGS. 6b–6f. Once the close function removes the data route from the search tree and frees the data entry, the corresponding data route is no longer valid. The read function reads queued data from the data stream associated with the specified data route and the write function writes data to the data stream associated with the data route. The ioctl function processes ioctl requests. If the ioctl request is not understood, then an error is returned. The supported ioctl's are a subset of what is supported in for example, Solaris 2 (Sun Microsystem's Unix-based operating system). An example of an ioctl which must be supported by all protocol modules include I__BIND which binds a producer to an open data route. Typically, this action will result in the completion of the data route which would be registered with the provider.

Data routing modules 205 are implemented as character devices in the UNIX File System. They are configured as pseudo-devices which are cloneable. When a user opens a data routing module, the open call will indirectly call the specfs open routine in the kernel which has been modified to check for the data routing module flag. If this flag is set on the module, then it will create a data routing vnode 201 and return it. The open system call will then associate the file descriptor which references a file pointer with the data routing vnode 201. Future use of the file descriptor will result in calls to the data routing vnode operations 202.

Figure 3:
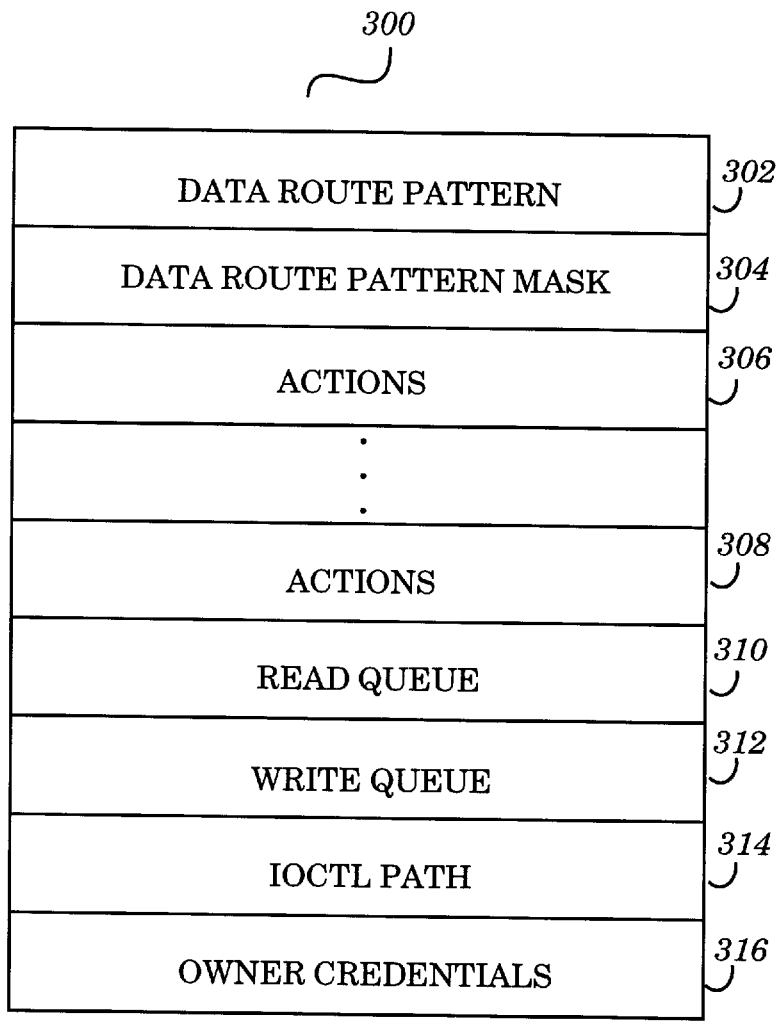
FIG. 3 illustrates an exemplary data route node.

FIG. 3 illustrates an exemplary data routing vnode. A data routing vnode contains information which describes how to route the data from a producer to a consumer. An exemplary data routing vnode 300 may contain the following information: data route pattern 302, data route pattern mask 304, a set of actions 306 used to route the data from the producer to the consumer on a data route hit, a set of actions 308 used to get the data or an acknowledgment from the consumer to the producer (the return route) on a data route hit, read queue 310 used for flow control, write queue 312 used for flow control, ioctl path 314 and data route owner's credentials 316.

Data route pattern 302 defines match criteria used to determine whether the data destination matches a defined route. For example, the pattern can include a value indicating that all data is a hit and should be delivered according to the specified actions. Given the detailed description of the invention contained herein, a person skilled in the art may implement various different match criteria.

Data route pattern mask 304 is utilized to mask the significant bits from the incoming data from the producer before performing an equivalence check between the data and a pattern in the data route table. The data route table is created by the file system information modules during operating system initialization.

Set of actions 306 and 308 refer to a list of actions or functions which are called in order to perform intermediate processing of the data before it is delivered to the consumer. Examples of such actions and functions would be, validating a checksum, XDRing data or removing header encapsulation. XDRing stands for External Data Representation. Some data routes may include a return route. This is useful for producers which expect data to be returned from the consumer. An example would be an RPC (Remote Procedure Call) based service where the initial route is between a network device and the server and the return route is between the server and the network device.

Read queue 310 is provided for cases where data is being transferred between a producer and a consumer and the consumer is not ready to receive the data. For example, when an NIU can receive and propagate data upstream (i.e. produce) faster than a disk controller can write the data to the disk, the data sent upstream maybe stored in read queue 310 until the disk controller is able to process the data. Write queue 312 is provided for cases where data is being returned on the return route at a rate faster than the producer can consume it. For example, when a disk controller can read data and propagate it downstream (i.e. produce) faster than an NIU can write the data to the network, the data sent downstream may be stored in write queue 312 until the NIU is able to process the data.

Ioctl path 314 is a list of ioctl routines which are called in order when an ioctl request is made on the file descriptor. Each ioctl routine is called until either the end of the list is reached or an ioctl routine returns a value indicating that the ioctl was performed.

Data route owner's credentials 316 refers to the owner of the data route credentials. Only the creator or the superuser of the data route can modify an existing data route, such as push protocol modules onto the route, or delete the route. Therefore the owner of the data route credentials are stored in the data route vnode.

Checking for data route hits is performed by the producer. If data, reply or acknowledgment needs to be returned to the producer, then the consumer does so using the return route provided in the data route. Once a data route has been registered, it cannot be modified. The route therefore must be unregistered before it is modified.

FIG. 4 illustrates an exemplary data route construction. In the presently preferred embodiment, the architecture of the data routing framework of the present invention uses the pushing/popping functionality also used in the STREAMS networking framework. It is possible to open up the data routing module and then push other data routing modules 205 on top of it. More specifically, a data route is constructed by opening a data routing module and then pushing modules onto the data routing module. The module at the top of the stack which is the consumer when an incoming data from the producer is being transmitted, can register a data route using an ioctl which goes to the bottom module which in this example is the producer and stores the data route with the producer. The device at the bottom of the stack is a producer of data when the data is coming up the stack, and a consumer of data when the data is going down the stack (i.e. the return route).

Each module adds its own data route to the data route vnode associated with the file descriptor on which the other data routing modules 205 are layered. This facility allows data routes to be built automatically since the data route associated with the vnode is the summation of the data routes for all modules which have been pushed on the vnode.

Some data routing modules 205 may have dependencies on other data routing modules 205. For example, with an exemplary protocol module 208, TCP is unusable unless it is layered on IP. For these modules, the correct layering occurs during the loading of the modules. The module looks up its dependent module, calls its open routine and then pushes itself on top of the module. The resulting data route includes the routes from both modules. The lower level module can open another module and push itself onto that module. This chain reaction continues until all subordinate modules have been loaded. At this point, the module on top will have a data route which is a product of its own data route concentrated with all the lower layer modules. This new route will become the prototype route for the module. The use of this dependency loading and module prototype route eliminates the need for functionality similar to this in the STREAM plumbing routines.

Not all data routing modules 205 may be pushed on each other. The data routing framework allows the module to specify the type of its downstream and upstream interfaces. Both interfaces are then further subdivided into an incoming and outgoing interface. When a module is pushed onto another module, the connecting streams are checked for compatibility.

In an exemplary embodiment illustrated in FIG. 4, data routing module 400 (illustrated in FIG. 2 as data routing modules 205) has the corresponding action 402 and the corresponding data route vnode 404 (illustrated in FIG. 2 as data route vnode 201). For example, an open module A, has data route vnodes $R_A$, a data route mask $M_A$, a set of upstream actions $A_A$, a set of downstream actions $RR_A$ and an ioctl path $I_A$. When a pattern match is performed for a given incoming data from a producer, the consumer indicates the set of intermediate actions and functions to invoke for the data to be transmitted to the consumer. Action 402 has in its column, an example set of intermediate actions to be performed for the data.

When action 402 is designated as being push module B on module A, a union is performed on the data route vnodes for module A and module B. Here, $R_B$ is the data route for module B, $M_B$ is the data route mask for module B, $A_B$ is a set of upstream actions for module B, $RR_B$ is a set of downstream actions for module B and $I_B$ is an ioctl path for module B. U is the union, join or an append operation exemplifying the action of pushing module B on module A.

In another exemplary data route construction, module C is pushed on module AUB. Here, $R_C$ is a data route for module C, $M_C$ is a data route mask for module C, $A_C$ is a set of upstream actions for module C, $RR_C$ is a set of downstream actions for module C and $I_C$ is an ioctl path for module C.

Yet another example of a data route construction is exemplified by the action of binding module AUBUC to $NIU_Z$.

Figure 5:
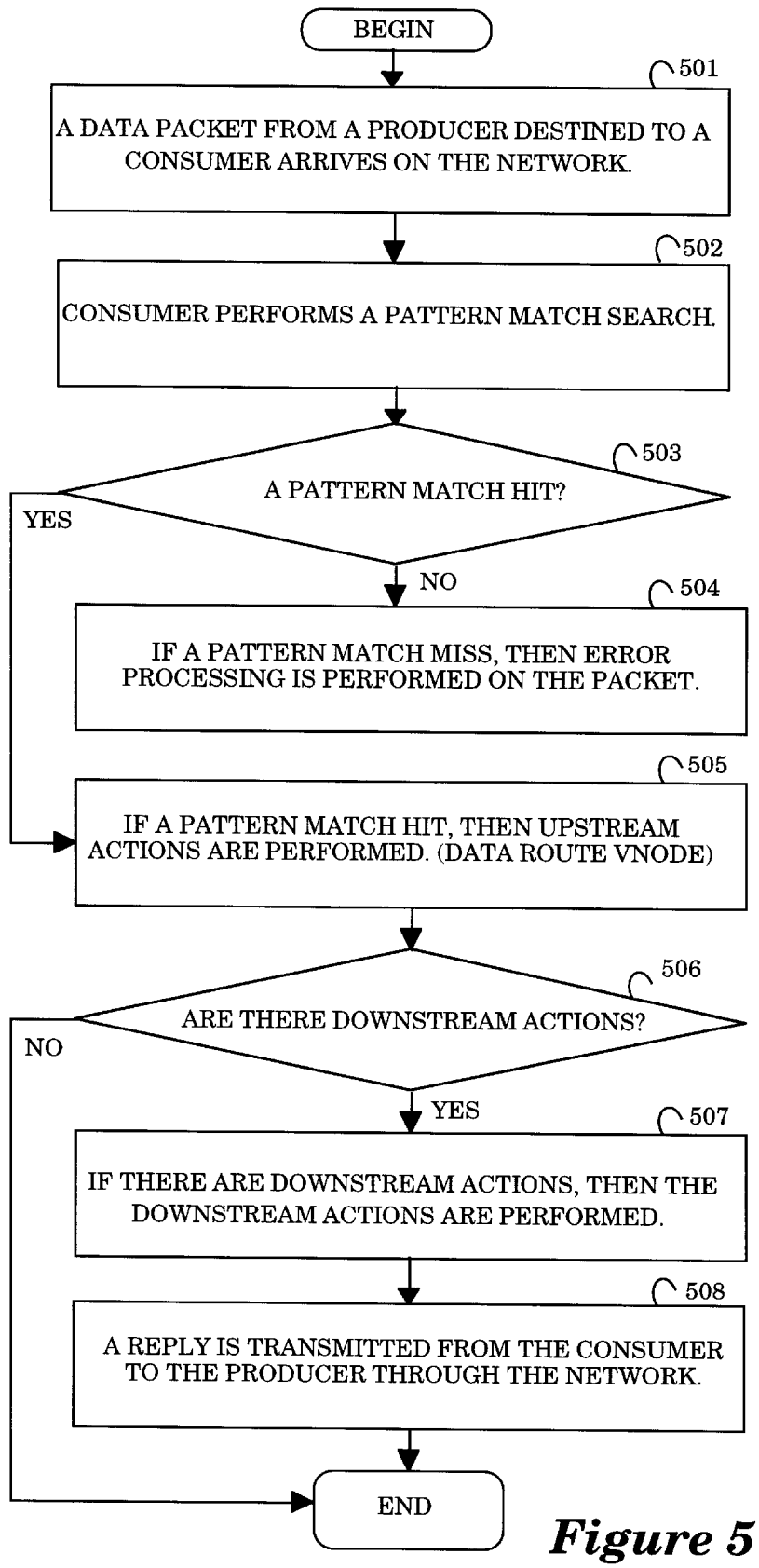
FIG. 5 is a flow diagram illustrating the general steps followed by the present invention.

FIG. 5 is a flow diagram illustrating the general steps followed by an embodiment of the present invention. In step

501, a data packet arrives on network 120 for computer system 100. The packet is from a producer and is destined for a given consumer. The consumer may tell the producer that it knows the path which a given incoming data will take if the incoming data matches a given pattern. If there is a match, then the consumer is able to inform the producer of the set of actions to be executed for that particular incoming data for the data to be properly transmitted to the consumer. In step 502, the producer performs a pattern match search on the incoming data to determine whether the incoming data matches a pattern (i.e. a data route) in a data route table (see FIG. 6a for details on searching data routes). In step 503, if there is no pattern match hit, then in step 504 the packet is dropped. Otherwise if there is a pattern match hit, i.e. if the incoming data matches a given pattern in the data route table, then a set of actions or functions are invoked which are necessary for the data to be transmitted from the producer to the consumer. More specifically, in step 505, upstream actions are performed (data route vnode). In step 506, if there are downstream actions, then in step 507 the downstream actions are performed. In step 508, a reply is transmitted from the consumer to the producer through the network. Otherwise, if there are no downstream actions then the process ends and no reply is transmitted to the producer.

Figure 6A:
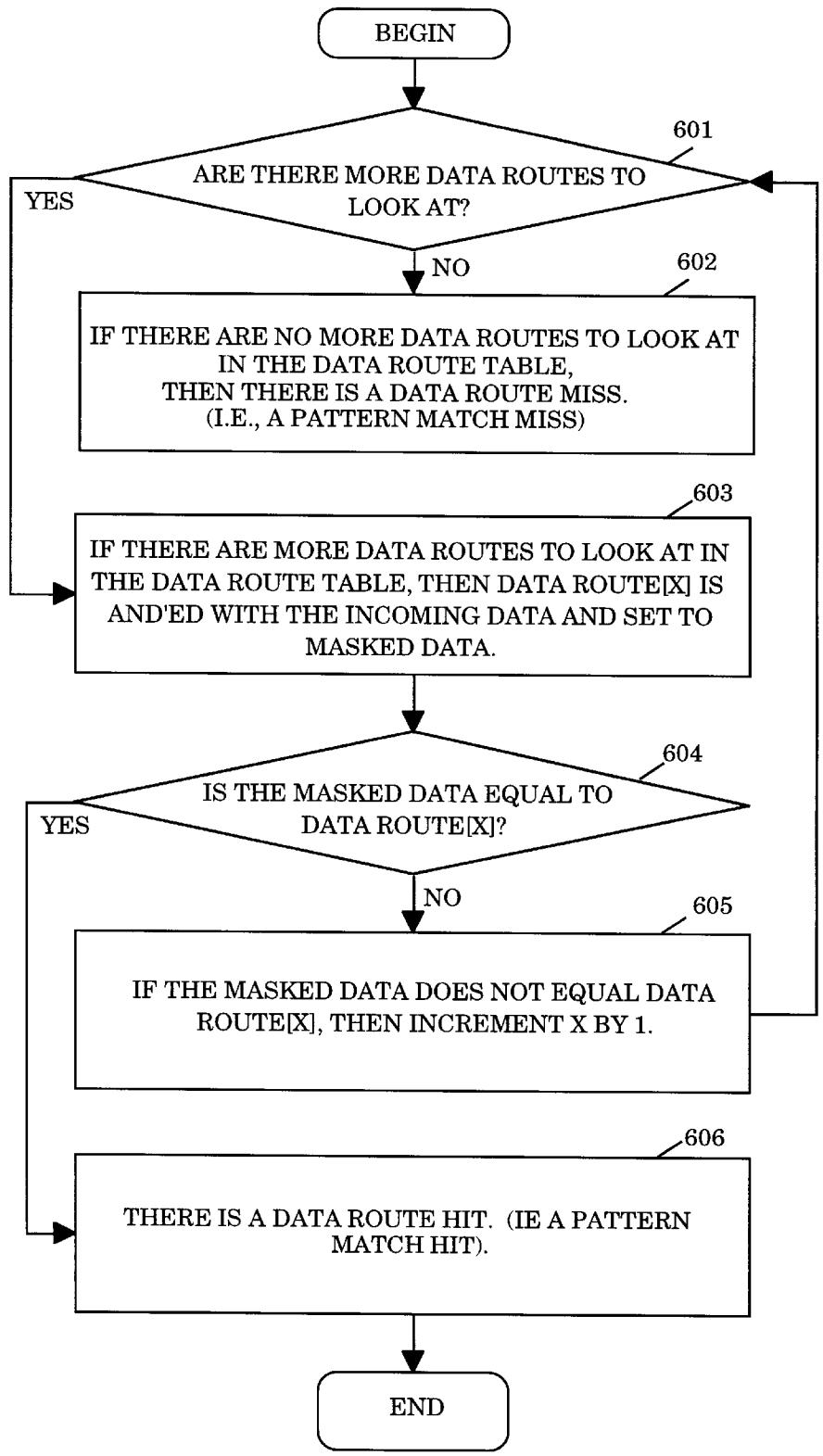
FIG. 6a is a flow diagram illustrating exemplary steps which may be followed in searching data routes.

FIG. 6a is a flow diagram illustrating exemplary steps which may be followed in searching data routes. In step 601, given incoming data from a producer, it is determined whether or not there are data routes to be searched in the data route table. In step 602, if there are no more data routes to be searched in the data route table, then there is a data route miss, i.e. a pattern match miss. Otherwise, in step 603, if there are more data routes [X] to be searched in the data route table, then the don't care mask of the next data route [X] to be checked is AND'd with the incoming data, resulting in the value of the masked data. In step 604, it is determined whether the masked data equals the data route [X]. In step 605, if the masked data does not equal data route [X], then X is incremented by one, i.e. the next data route in the data route table to be checked and the process is repeated. Otherwise, in step 606, if the masked data is equal to data route [X], then there is a data route hit, i.e. a pattern match hit and the process is completed.

FIGS. 6b–6f illustrate an exemplary Patricia Tree search implementation of a data route table search as utilized by the present invention. Data route entries in the Patricia Tree, also referred to herein as data route keys, are variable with sequences of bytes with some keys as long as 80 bytes. Since the data route search will be performed for every complete IP packet coming into a system, it is pertinent that the search algorithm used be optimized for time.

In the presently preferred embodiment of the present invention, variable length keys are stored in a Patricia Tree. Patricia Trees are radix trees which allow searching arbitrarily long trees in a tree with just nodes and which requires only one full key comparison per search. The Patricia Tree is a well known concept. It takes one N-bit comparison for an average search. For 50 routes, it takes about 7 bit comparisons which is approximately O(SQRT (N)).

Every data route vnode in a Patricia Tree as utilized by the present invention contains: data route value, data route mask and bit number to check. Given the data route bit 610, the associated data route bit patterns 612 and the associated mask 614 illustrated in FIG. 6b, the first step in the Patricia Tree search for the present invention is to enter the first node which is the top node of the tree. In this example, bits are numbered as follows: bit numbers 0, 1, 2, 3, 4 . . . N, equal to the values of 0, 1, 1, 0, 0 . . . 0.

In FIG. 6c, route A is inserted into the Patricia Tree which has left and right node pointers pointing back to route A.

In FIG. 6d, route P is inserted. The number of bits in the A node is utilized to check the corresponding bit in B. If the bit in B is a 1, then route B is inserted as a left node. Otherwise route B is inserted on the right. In the present example, since the bit is a 0 and that node is an upward pointer, the node is inserted on the right.

In FIG. 6e, route C is inserted. The bit number in the A node is checked, and the corresponding bit in C is checked. The bit is a 0, so we now check node B. The bit number in the B node is checked and the corresponding bit in C is also checked. The bit is a 1 since the link points upward. Therefore, the C node is inserted there.

FIG. 6f is the completed Patricia Tree. Assuming that the 01000111000 data is the incoming data to be processed. The search begins at node A illustrated in FIG. 6e. Bit 0 is inspected and since it is a 0 in the incoming data, the tree is traversed to node B. Bit 1 is inspected and since it is a 1 in the incoming data, the tree is traversed to node C. Bit 2 is inspected and since it is a 0 in the incoming data, and this link points back (or upward) the tree, the search has ended. The final step is to determine if there is a hit or a miss in the search in the Patricia Tree. The mask at node C is AND'ed with the incoming data. The result is then compared to the data route at node C. If they are equivalent, then there is a search hit. This is illustrated in FIG. 6f. In the example at hand, the masked data 660 and the data route 662 are equal. Therefore, there is a data route hit.

With an embodiment of the present invention using a Patricia Tree, every producer type is assigned its own Patricia Tree. For example, with incoming IP packets, searches are performed on the Patricia Tree containing IP related routes which include several higher level protocols like UDP and TCP. The producer makes the decision on which tree to search for a given packet. For example, an Ethernet driver makes the decision based on the ether type field value. Each key has a mask stored with it. The mask is used to mask off the don't care bits from a packet before doing a compare with the key value. The data route keys can be dynamically added and deleted from a tree.

The head of the Patricia Tree contains a lock which must be acquired and held while performing insertions, deletions and searches. This protects the Tree in multi-processor systems and also if the producer routines are called at interrupt level. A lazy deletion algorithm may be used in which a key is marked as deleted but left in the tree. When the number of deleted keys become significant, the tree is rebuilt. The tree lock is not held during the rebuilding of the tree. However, if a flag is set in the tree head indicating that a rebuild is taking place, then the insertion and deletion operations should go to sleep waiting for the rebuild to be complete. The rebuild should take place when idle cycles are available. The present invention's architecture of data routing is not dependent on Patricia Trees and hence other search algorithms may be used instead.

What has been described is a method and an apparatus for a new communication framework referred to herein as the data routing framework. This new method and apparatus overcomes many disadvantages of the prior art communication framework referred to as the layered approach. The present invention allows computer systems to establish data routes between a consumer and a producer of data without having to have the data transmitted through layers of modules between the consumer and the producer.

An exemplary list of the supported operations and the functionality required of a sample of vnode operation are listed in appendix A, a sample of data routing modules 205 are listed in appendix B (producer module 206) and appendix C (protocol module 208).

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

APPENDIX A
Functionality required of a sample of vnode operations:

```
close
    If the reference count on the file table entry is 0, then call
    VOP_INACTIVE to inactivate the data routing vnode.
read
    reads data that comes up the stream.
write
    writes data down the stream.
ioctl
    The following values are recognized. The ioctl command value
    is identical to the value used in STREAMS. This decision was
    made to preserve compatibility with applications that do
    STREAM ioctls.
    I_PUSH
        If the data routing vnode is a registered route, then
        remove the route from the producers list of routes and set
        a flag in the data routing vnode, indicating that the route
        needs to be re-registered if possible. Then call then
        pushed modules open routine which will modify the
        route. The modified route would only be re-registered if
        the pushed modules I_BIND ioctl was a no-op.
    I_POP
        If there is a route registered for this stream, then remove
        the route. This operation calls the modules close routine
        which will then register the modify route once the
        necessary data has been provided.
        Using successif I_POP calls to dismantle a route would
        work, but is not recommended because it continually
        deletes, and then adds a subset of the original route which
        increases the systems overhead. It doesn't make sense to
        route incoming requests based on these partial routes
        since this path through the protocol stack is being torn
        down. The best approach is to close the file pointer
        associate with the data route.
    I_FIND
        Look to see a module has already been pushed onto a
        data route.
    I_FLUSH
        This ioctl maps into a fsync call on the file descriptor. It is
        provided for backwards compatibility with STREAMS.
    The following values are not recognized and will return an
    EINVAL if used:
    I_LINK
    L_PLINK
    I_UNLINK
    I_PUNLINK
        Data routes by their nature automatically handle
        multiplexing tasks. Even so, a module for one reason or
        another may decide to change the route the data is taking.
        This is perfectly legal and easy to do. Both upstream and
        downstream routes can be changed.
        The method for dealing with NIUs and how to do weak
        binding on them to a data route is discussed in the NIU
        module section.
link
    This routine is called when module B is pushed on top of
    module A. The data route for module B is appended to the data
    route that already exists for the data routing vnode which
    includes module A's prototype route.
fsync
    Requests that all queued data for the specified route be flushed
    (i.e. discarded). This routine has the same semantics as
    MFLUSH in STREAMS.
inactive
    This routine is called when a data route vnode is no longer
    referenced. The data route is removed from the producers
    search tree and freed.
```

Note that the open vnode operation is not implemented for the data routing vnode. This is because the specfs open routine is used when opening a data routing module which calls the modules open routine. The VOP_OPEN() is never used on a data routing node.

APPENDIX B
Producer device driver modules must implement the following functions:

```
open
    Performed when the network layer is binding a network address
    to the NIU. The routine doesn't take a pointer to a *devp;
    instead it takes a pointer to a vnode.
close
    Performed when the network layer is unbinding a network
    address to the NIU.
read
    Networking device drivers read routine. Called when the
    device receives a packet.
write
    Networking device drivers write routine. Called to send a
    packet out onto the network. The address of this routine is
    returned in the I_DRTE_NIU_IPIF ioctl so that it can be called
    directly by the networking layer.
ioctl
    Processes ioctl requests. If the ioctl request is not understood,
    then an error is returned. Driver ioctls may be NIU specific, the
    following is a list of ioctls that all NIU drivers should support:
    I_DRTE_NIU_IF
        Returns a DRTE_IF_T structure containing information
        about the interface.
    I_REG_ROUTE
        The specified route is registered with the producer.
    I_UNREG_ROUTE
        The specified route in unregistered with the producer.
```

APPENDIX C
Protocol modules must implement the following functions:

```
open
    Updates the passed in data routing entry. The modules
    prototype data route, mask, actions, and ioctl list is added to the
    end of the vnodes data route respective fields.
close
    Removes the data route from the search tree and frees the data
    routing entry. The data route is no longer valid.
read
    Read data from a stream.
write
    Write data to a stream.
    Reads queued data from the data stream associated with the
    specified data route.
write
    Writes data to the data stream associated with the specified data
    route.
ioctl
    Processes ioctl requests. If the ioctl request is not understood,
    then an error is returned. In general, the supported ioctls are a
    subset of what is supported in Solaris 2. The list of ioctls that
    must be supported by all protocol modules follows:
    I_BIND
        Binds an address to an open data route. Typically, this
        action will result in the completion of the data route
        which would be registered with the provider.
```

Exemplary protocol modules:

---

IP open
    Allocates a data routing entry, filling in the portions of the data route pattern, mask, actions, and ioctl path that apply to IP.
close
    Removes the data route from the search tree and frees the data routing entry. The data route is no longer valid.
read
    Reads data from the data stream associated with the specified data route.
write
    Writes data to the data stream associated with the specified data route.
icotl
    Processes ioctl requests. If the ioctl request is not understood, then an error is returned. The ioctls follow:
    SIOCSIFADDR
        Assigns an IP address to the specified NIU. The NIUs open routine will be called.
    SIOCGIFADDR
        Returns the IP address associated with the specified NIU
    SIOCSIFNETMASK
        Assigns an IP netmask to the specified NIU. This call will fail if the IP address has not been set.
    SIOCGIFNETMASK
        Returns the IP netmask associated with the specified NIU.
    SIOCSIFFLAGS
        Set interface flags.
    SIOCGIFFLAGS
        Get interface flags.

UDP open
    Calls the IP module open routine which returns a file descriptor. It then pushes the UDP module on the data route, filling in the portions of the data route pattern, mask, actions, and ioctl path that apply to UDP.
close
    Calls the IP module close routine which destroys the data route. The data route is no longer valid.
read
    Reads data from the data stream associated with the specified data route.
write
    Writes data to the data stream associated with the specified data route.
ioctl
    Processes ioctl requests. If the ioctl request is not understood, then an error is returned.

---

What is claimed:

1. A method for pre-configuring a data route for data traveling between a producer and a consumer on a computer system, said producer being a source of said data and said consumer being a destination for said data, said method comprising the steps of:
    generating at least one data packet to be transmitted to said consumer, said generating being performed by said producer;
    performing a pattern match search on said data packet to determine whether a pattern in said data packet has a matching data route in a data route table, said data route table including a plurality of predetermined data routes, said data route indicating a set of actions to be performed for said data packet; and
    performing said set of actions on said data packet according to said data route to enable transmission of said data packet to said consumer.

2. The method of claim 1 comprising the further step of performing error processing on said data packet if said pattern match search results in a pattern match miss.

3. The method of claim 1 further comprising the step of transmitting a reply from said consumer to said producer if a downstream action is performed.

4. The method of claim 1 wherein said step of performing a pattern match further comprises the step of searching a data route table for matches with said data route of said data packet.

5. The method of claim 4 further comprising the step of generating a pattern match hit when said data route table has a pattern matching said data packet.

6. A computer-implemented system for pre-configuring a data route for data traveling between a producer and a consumer on a computer system, said producer being a source of said data and said consumer being a destination for said data, said system comprising:
    a data route virtual node configured to store data routing information for said data including a data route pattern for defining match criteria used in a pattern match search to determine a data route for said data;
    a data route table comprising a plurality of predetermined data routes, said data route being obtained from said data route table if said pattern match search results in a matching said data route for said data;
    a set of data routing virtual node operations coupled to said data route virtual node and configured to maintain said data route virtual node; and
    a set of data routing modules coupled to said set of data routing virtual node operations and configured to perform a set of actions on said data according to said data route virtual node for enabling transmission of said data from said producer to said consumer, said set of actions representing said data route obtained from said data route table.

7. The system of claim 6 wherein said data route virtual node comprises a data route pattern for defining match criteria used to determine whether a data destination matches a defined data route.

8. The system of claim 6 wherein said data route virtual node comprises a data route pattern mask for masking significant bits from said data before a data route match is performed on said data and an entry in said data route table, coupled to said data route pattern.

9. The system of claim 6 wherein said data route virtual node comprises a set of actions for processing said data for transmission from said producer to said consumer, coupled to said data route pattern mask.

10. The system of claim 6 wherein said data route virtual node comprises a read queue for storing said data when said data is being transferred from said producer to said consumer and said consumer is not ready to receive said data, coupled to said set of actions.

11. The system of claim 6 wherein said data route virtual node comprises a write queue for storing said data when said data is being returned on a return route at a rate faster than said producer can consume said data, coupled to said read queue.

12. The system of claim 6 wherein said data route virtual node comprises an input/output control path for performing a list of input/output control routines when an input/output control request is made on a file descriptor, coupled to said write queue.

13. The system of claim 6 wherein said data route virtual node comprises an owner credential for indicating ownership of data route credentials, coupled to said input/output control path.

14. A system for pre-configuring a data route for data traveling between a producer and a consumer on a computer system, said producer being a source of said data and said consumer being a destination for said data, said system comprising:

a memory device containing,
- a data route virtual node configured to store data routing information for said data including a data route pattern for defining match criteria used in a pattern match search to determine a data route for said data,
- a data route table comprising a plurality of predetermined data routes, said data route being obtained from said data route table if said pattern match search results in a matching said data route for said data,
- a set of data routing virtual node operations coupled to said data route virtual node and configured to maintain said data route virtual node, and
- a set of data routing modules coupled to said set of data routing virtual node operations and configured to perform a set of actions on said data according to said data route virtual node for enabling transmission of said data from said producer to said consumer, said set of actions representing said data route obtained from said data route table; and
- a processor coupled to said memory device for processing said set of data routing virtual node operations and said set of data routing modules.

15. The system of claim 14 wherein said data route virtual node comprises a data route pattern for defining match criteria used to determine whether a data destination matches a defined route.

16. The system of claim 14 wherein said data route virtual node comprises a data route pattern mask for masking significant bits from said data before a data route match is performed on said data and an entry in said data route table.

17. The system of claim 14 wherein said data route virtual node comprises a set of actions for processing said data for transmission from said producer to said consumer.

18. The system of claim 14 wherein said data route virtual node comprises a read queue for storing said data when said data is being transferred from said producer to said consumer and said consumer is not ready to receive said data.

19. The system of claim 14 wherein said data route virtual node comprises a write queue for storing said data when said data is being returned on a return route at a rate faster than said producer can consume said data.

20. The system of claim 14 wherein said data route virtual node comprises an input/output control path for performing a list of input/output control routines when an input/output control request is made on a file descriptor.

21. The system of claim 14 wherein said data route virtual node comprises an owner credential for indicating owner of data route credentials.

* * * * *